April 14, 1942.  D. McDONALD  2,279,408
SEPARATION OF CONSTITUENTS OF ANIMAL AND VEGETABLE OILS
AND RESIDUE FROM REFINING THEREOF
Filed June 6, 1939
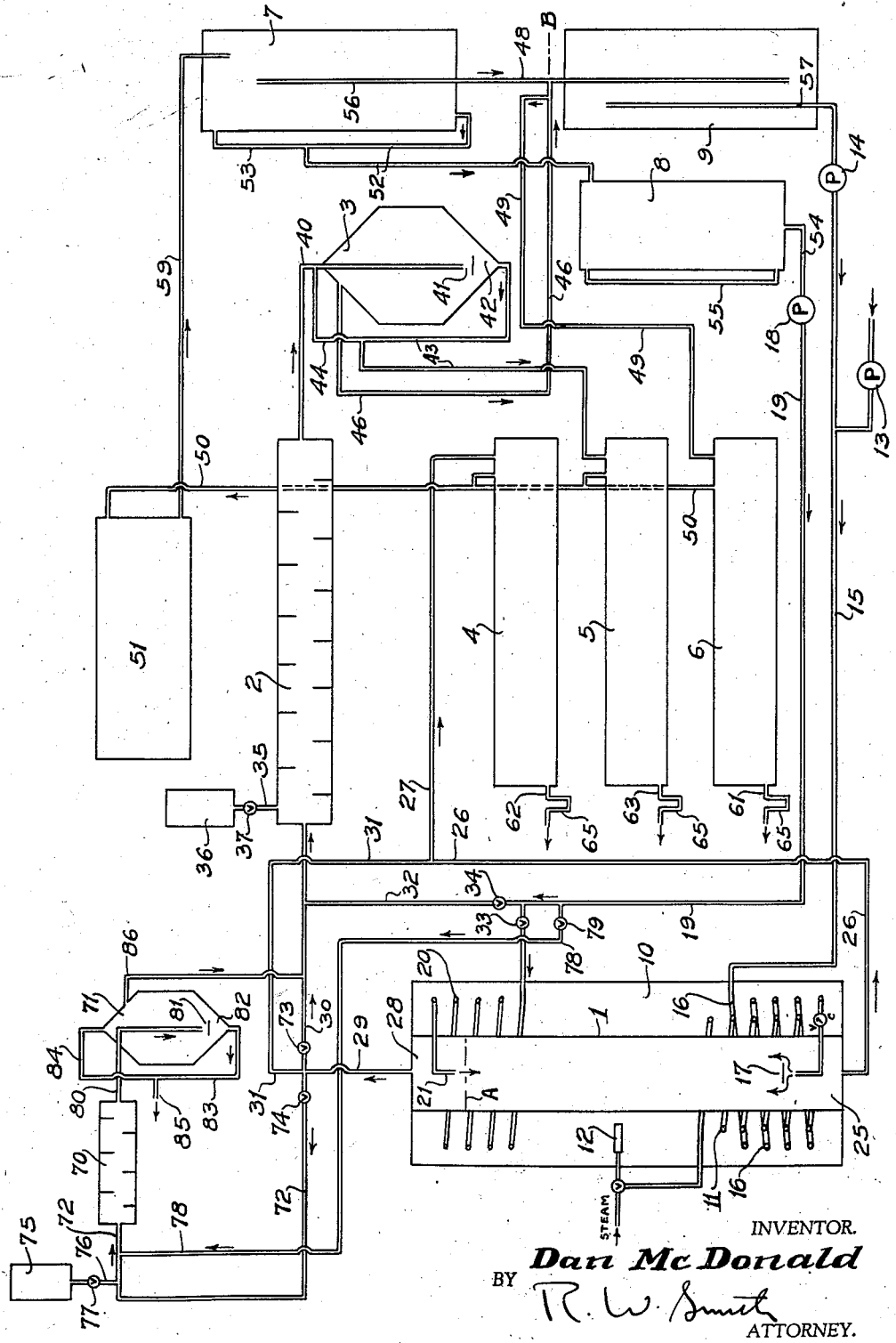
INVENTOR.
Dan McDonald
BY
R. W. Smith
ATTORNEY.

Patented Apr. 14, 1942

2,279,408

UNITED STATES PATENT OFFICE 2,279,408

SEPARATION OF CONSTITUENTS OF ANIMAL AND VEGETABLE OILS AND RESIDUE FROM REFINING THEREOF

Dan McDonald, Santa Monica, Calif., assignor to Erwin H. Haas, as trustee

Application June 6, 1939, Serial No. 277,638

18 Claims. (Cl. 260—428)

This invention relates to separation of constituents of animal and vegetable oils and residue from refining thereof. Animal and vegetable oils, and residue from the refining of these oils, include fatty acid radicles as free fatty acids, glycerides, i. e., neutral and/or unsaponifiable oils, and/or salts of fatty acids, together with constituents containing no fatty acid radicle, e. g., glycerine and various undesirable constituents such as coloring matter and other residual components.

The term "oleaginous constituents" is herein used to distinguish those constituents which include a fatty acid radicle, from those constituents which contain no fatty acid radicle and which are herein referred to as "remaining constituents." The term "oleaginous material" is herein used to designate animal and vegetable oils and residue from refining thereof, which may include both oleaginous and remaining constituents, as these terms are herein defined.

It is an object of the invention to solvent-extract oleaginous constituents while remaining constituents are dissolved and/or suspended in a medium which is immiscible with the solvent for the oleaginous constituents, whereby the resulting oil-bearing solvent may be gravitationally separated from the solution and/or suspension of remaining constituents.

It is a further object of the invention to separate neutral and/or unsaponifiable oils from free fatty acids and remaining constituents and to then separate free fatty acids from remaining constituents, whereby neutral and/or unsaponifiable oils, and free fatty acids, may be separately recovered.

It is a still further object of the invention to effect this successive separation by solvent-extracting and separating neutral and/or unsaponifiable oils from remaining constituents and from free fatty acids which are present as soap, with the solvent for the neutral and/or unsaponifiable oils one in which soap is insoluble, and with free fatty acids then separately recovered.

It is a still further object of the invention to separately recover free fatty acids by displacing free fatty acids from their salts and then solvent-extracting and separating free fatty acids from remaining constituents, with the solvent for the free fatty acids one in which remaining constituents are insoluble.

It is a still further object of the invention to solvent-extract neutral and/or unsaponifiable oils, with free fatty acids (which are present as soap) in solution and with remaining constituents in solution and/or suspension in a medium which is immiscible with the solvent for the neutral and/or unsaponifiable oils, for gravitational recovery of the oil-bearing solvent separate from free fatty acids and remaining constituents, and with the free fatty acids then displaced from their salts and solvent-extracted, with the aforesaid medium (in which remaining constituents are dissolved and/or suspended) immiscible with the solvent for the free fatty acids, whereby the free fatty acid solution may be gravitationally separated from the solution and/or suspension of remaining constituents.

If oleaginous material (as herein defined) has stood for a relatively long time with its free fatty acids present as soap, separating its constituents by the process herein described becomes impractical, due probably to changes in structure of the oleaginous material which occur after appreciable time interval. On the other hand, if the oleaginous material is processed within a relatively short time after saponification of its free fatty acids, separation of its constituents is readily obtained by the process herein described.

Therefore, when processing oleaginous material in which free fatty acids are present as such, e. g., grease which has been extracted from garbage, etc., the free fatty acids are saponified, and the material is then processed as herein described within a relatively short time after saponification of the free fatty acids; and when processing oleaginous material in which free fatty acids are present as soap, e. g. soap stock, it is processed as herein described within a relatively short time after the soap stock has been formed by the refining process of which it is a residue.

As an instance, processing as herein described provides efficient separation of constituents when free fatty acids have been saponified not more than five or six days prior to said processing, this particular time interval being based upon processing usual run of soap stock, i. e., that obtained from refining vegetable oils such cottonseed, soya bean, sesame, corn and palm nut; whereas processing as herein described has not provided efficient separation of constituents of usual run of soap stock when the latter has stood several weeks after being formed and before processing the same.

Therefore, the term "oleaginous material" as previously defined, is herein employed to designate material in which free fatty acids have been saponified within such relatively short time interval prior to processing as herein described, as will not have resulted in such structural changes of the oleaginous material as to prevent efficient separation of constituents when employing the process herein described.

Further objects of the invention will be readily understood from the following description of the accompanying drawing which diagrammatically illustrates a form of apparatus which may be employed, it being understood that the apparatus which is shown and described is for purpose of illustration, and that the invention may be modified and is entitled to various specific embodiments without departing from the scope of the appended claims.

The invention is applicable to separating and recovering oleaginous constituents from various compositions, such as animal and vegetable oils which still include some undesirable remaining constitutents (as this term is herein used), grease which has been extracted from garbage or other raw material, residue from refining animal and vegetable oils, etc.; and is particularly applicable and is herein described with reference to recovery of oleaginous constituents from soap stock obtained from alkaline refining of vegetable or animal oils.

Soap stock contains water in varying quantities, usually 40 to 65%, alkaline salts of free fatty acids, i. e. soap, neutral and/or unsaponifiable oils, glycerine, and various other constituents, principally sodium silicates, depending upon the particular refining process which has been employed.

Oleaginous constituents, i. e. neutral and/or unsaponifiable oils and free fatty acids, are solvent-extracted from remaining constituents which are dissolved and/or suspended in a medium which is immiscible with the solvent for the oleaginous constituents, for gravitational separation of the oil-bearing solvent from the dissolved and/or suspended remaining constituents.

Neutral and/or unsaponifiable oils are preferably recovered separate from free fatty acids; and for this purpose initial solvent-extraction is of neutral and/or unsaponifiable oils, with free fatty acids present as soap in solution and with remaining constituents in solution and/or suspension in a medium which is immiscible with the solvent for the neutral and/or unsaponifiable oils. In the case of soap stock, free fatty acids will be present as soap, having been saponified in the refining process from which the soap stock has been obtained; or if free fatty acids have not been previously saponified, as for example when processing grease from garbage, etc., they are saponified in usual manner by adding a caustic prior to or during initial solvent-extraction of neutral and/or unsaponifiable oils.

The oil-bearing solvent, i. e., the solution of neutral and/or unsaponifiable oils, is gravitationally separated from the immiscible medium in which the saponified free fatty acids are dissolved and in which remaining constituents are in solution and/or suspension. This solution of soap and solution and/or suspension of remaining constituents is then separately processed for displacing free fatty acids from their salts, with the free fatty acids then solvent-extracted and recovered separately from remaining constituents which remain dissolved and/or suspended in the aforesaid medium which is immiscible with the solvent for the free fatty acids.

The solvent constituent of the initially separated solution of neutral and/or unsaponifiable oils may be recovered by distillation for reuse, the solvent constituent of the separately recovered free fatty acid solution may be separately distilled for recovery of the solvent for reuse, and the solution and/or suspension of remaining constituents may be separately distilled for recovering for reuse the medium in which said remaining constituents have been dissolved and/or suspended.

The solvent for the neutral and/or unsaponifiable oils, and the solvent subsequently employed for extracting free fatty acids, may be any suitable solvent in which neutral and unsaponifiable oils and free fatty acids are soluble, but in which saponified free fatty acids and remaining constituents are insoluble, and which is immiscible with the medium in which the saponified free fatty acids are dissolved and the remaining constituents are dissolved and/or suspended, and which is of specific gravity for ready separation of the solution of neutral and/or unsaponifiable oils from the soap solution and from the solution and/or suspension of remaining constituents.

For this purpose, chlorinated hydrocarbons may be advantageously employed, preferably perchlorethylene, which has a boiling point above the temperature (hereinafter described) which is preferably employed, and which has a relatively high specific gravity; it being understood however that reference hereinafter to perchlorethylene, is for brevity of description and is not a limitation to this particular solvent.

The medium in which saponified free fatty acids are dissolved and remaining constituents are dissolved and/or suspended during solvent-extraction of neutral and/or unsaponifiable oils, and which is immiscible with the solvent for the neutral and/or unsaponifiable oils, may be the water-content of the material being processed, e. g., the normal 40 to 65% water-content of soap stock, together with an emulsion-preventing medium which is miscible with water and which, together with water, is an efficient solvent for soap and in which remaining constituents are readily dissolved and/or suspended. As an instance of a suitable emulsion-preventing medium, an alcohol such as ethyl or methyl alcohol may be advantageously employed, preferably methyl alcohol due to government restrictions upon distillation of ethyl alcohol.

The alcohol is preferably added in aqueous solution of such concentration that the ratio of alcohol to total water-content, i. e., the water-content of the material to be processed together with the water-content of the aqueous alcohol, is such as to provide maximum decrease of surface tension of the material to be processed without the alcohol picking up the solvent for the oleaginous constituents. For this purpose, the alcohol is added in aqueous solution of such concentration, depending upon the original water-content of the material to be processed, that the alcohol is approximately 35 to 50% by volume of the total water-alcohol content, i. e., the water-content of the material to be processed together with the water-alcohol content of the added aqueous alcohol. In practice, when employing methyl alcohol and perchlorethylene, the alcohol is preferably added in aqueous solution whereby it forms approximately 40% of the total water-alcohol content. For example, when processing soap stock which is of that type which is 50% water, an aqueous solution of 50% alcohol is added, two volumes of aqueous alcohol to one volume of soap stock, whereby the alcohol is 40% of the total water-alcohol content.

The aqueous alcohol is added to the material which is to be processed, thereby dissolving saponified free fatty acids, suspending neutral and/or unsaponifiable oils, and dissolving and/or suspending remaining constituents; and solvent such as perchlorethylene is then added, whereby neutral and/or unsaponifiable oils are dissolved in the perchlorethylene and this oil-bearing solvent gravitationally settles and is withdrawn, for separate withdrawal of the aqueous-alcohol in which saponified free fatty acids are dissolved and remaining constituents are in solution and/or suspension.

The alcohol, when not less than approximately 35% and not more than approximately 50% of the total alcohol-water content, is present in sufficient quantity to decrease surface tension so as to prevent emulsion of the soap solution with the solution of neutral and/or unsaponifiable oils, but is not present in such quantity as to pick up and withdraw a portion of the solvent for the neutral and/or unsaponifiable oils, along with the aqueous-alcohol.

For efficient solvent-extraction of the neutral and/or unsaponifiable oils, and for complete gravitational separation of the oil-bearing solvent from the aqueous-alcohol in which soap is dissolved and in which remaining constituents are dissolved and/or suspended, counterflow solvent-extraction is preferably employed. For this purpose, the aqueous alcohol which is employed, is added to the material which is to be processed and the resulting solution-suspension is supplied to the lower portion of an extraction column, with solvent such a perchlorethylene supplied to the upper portion of the column. The heavier perchlorethylene settles through the solution-suspension and after dissolving neutral and/or unsaponifiable oils is withdrawn from a quiescent zone below the inlet for said solution-suspension, while the lighter solution-suspension of soap and remaining constituents rises through the perchlorethylene for withdrawal via a quiescent zone above the inlet for the latter.

Heat is preferably employed during this solvent-extraction and gravitational separation, for increasing the rate at which soap dissolves in the aqueous alcohol, and for decreasing viscosity and surface and interfacial tension, whereby maximum diffusion is obtained with neutral and/or unsaponifiable oils released from enclosing films of the alcohol-water-soap solution, so that substantially all the neutral and/or unsaponifiable oils are dissolved and the resulting oil-bearing solvent readily gravitationally separates from the alcohol-water-soap solution. The temperature employed is preferably just below the boiling point of the alcohol-water-soap solution, thereby obtaining maximum efficiency compatible with absence of ebullition which if present would retard gravitational separation; and for this purpose a temperature of from approximately 140° F. to just below the boiling point of the alcohol-water-soap solution is preferably employed. In practice, when the alcohol is approximately 40% of the total alcohol-water content, the flow in the extraction column is maintained at a temperature of approximately 150 to 155° F., which is below the boiling point of the alcohol-water-soap solution.

In addition to soap and any other constituents which dissolve in the aqueous alcohol, remaining constituents, principally sodium silicates (in the case of soap stock), which for the greater part are insoluble in aqueous alcohol, remain suspended therein, since their specific gravity is less than that of the gravitationally separated oil-bearing solvent and the rate of upward flow of the alcohol-water-soap solution is sufficient to carry with it this suspension of insoluble constituents (even though their specific gravity may be slightly greater than that of the water-alcohol-soap solution), but without such excessive rate of upward flow as would retard gravitational separation of the oil-bearing solvent. For this purpose, the rate of flow at which the aqueous-alcohol solution-suspension is supplied to the lower portion of the extraction column is such that upward flow of the water-alcohol-soap solution through the quiescent zone above the level of the solvent for neutral and/or unsaponifiable oils is preferably within a range of approximately ½ inch to 1 inch per minute. In practice, a rate of upward flow of approximately ½ inch per minute is preferably maintained through this upper quiescent zone, when using perchlorethylene as the solvent for the neutral and/or unsaponifiable oils, this rate of flow being slower than the rate of settling of the oil-bearing solvent, but sufficient to maintain insoluble constituents in suspension in the aqueous alcohol for withdrawal therewith.

The aqueous alcohol in which soap is in solution and remaining constituents are in solution and/or suspension, and from which neutral and/or unsaponifiable oils have been solvent-extracted and separately withdrawn, is then processed for separate recovery of the free fatty acids of the soap. For this purpose, the free fatty acids are displaced from their salts, preferably by acidification, and the free fatty acids are then dissolved in a solvent which is immiscible with the aqueous alcohol in which remaining constituents are dissolved and/or suspended, and which is of specific gravity for gravitational separation of the free fatty acid solution from the aqueous alcohol. For this purpose, a solvent such as previously described, e. g., a chlorinated hydrocarbon, preferably perchlorethylene, may be advantageously employed.

As an instance of this separate recovery of free fatty acids, the aqueous alcohol in which soap is in solution and in which remaining constituents are dissolved and/or suspended, is withdrawn from the extraction column to a suitable mixer for flow therethrough. Acid, such as sulfuric acid, sufficient to displace free fatty acids from their salts, is supplied to the mixer, and a solvent such as perchlorethylene is also supplied to the mixer for dissolving the displaced free fatty acids. The flow through the mixer is preferably maintained at approximately not less than 145° F., for decreasing surface tension so as to insure maximum speed and completeness of separation of the displaced free fatty acids which are in solution in the perchlorethylene. In practice, this desired temperature may be maintained during flow through the mixer, as a result of the slightly higher temperature of approximately 150 to 155° F. which has been maintained in the extraction column, without further heating of the flow as it passes through the mixer.

The mixer discharges into the lower portion of a settling chamber, in which the solution of free fatty acids gravitationally separates into a quiescent zone below the inlet to this settling chamber, while remaining constituents, principally alkaline salts of the acid used for displacing free fatty acids from their soaps, and sodium silicates, glycerine, coloring matter, etc., which may have been present with the material as originally supplied for processing, remain in solution and/or suspension in the aqueous alcohol and rise in the settling chamber above the solution of free fatty acids, for separate withdrawal.

The rate of upward withdrawal of this solution and/or suspension, is such that insoluble sodium silicates and any other insoluble constituents remain in suspension for withdrawal with the glycerine and other soluble constituents, this desired upward withdrawal of suspended constituents being readily obtained without retarding gravitational separation of the solution of free fatty acids, when employing a rate of flow such as previously described, e. g., approximately ½ inch per minute, vertical flow.

The initially separated solution of neutral and/or unsaponifiable oils, the separately recovered solution of free fatty acids and of any minute quantities of saponifiable waxes and resins which have been separated therewith, and the separately withdrawn aqueous alcohol with remaining constituents in solution and/or suspension, are preferably then separately distilled. Neutral and unsaponifiable oils are thus recovered separately from free fatty acids which are in turn recovered separately from remaining constituents. The vapors from the stills, comprising solvent such as perchlorethylene and aqueous alcohol, are condensed and the perchlorethylene is gravitationally separated from the aqueous alcohol. A portion of the perchlorethylene is then reused for extracting neutral and/or unsaponifiable oils at the initial stage of the process, and the remainder of the perchlorethylene is reused for extracting free fatty acids which have been displaced from the soap solution which has been withdrawn from the separately recovered neutral and/or unsaponifiable oils. The aqueous alcohol is reused by supplying it to additional material which is to be processed. Excess water of the aqueous alcohol which has been used for processing material, i. e., water from the material which has been processed, is automatically expelled so as to maintain the desired alcohol-water ratio when processing additional material.

As an instance of suitable apparatus for use in the process as thus described, the system may include an extraction column 1, a mixer 2, a settling chamber 3, stills 4, 5 and 6, a separator 7, and storage tanks 8 and 9.

The extraction column 1 is preferably jacketed by a water-bath 10 which may be heated by a steam coil 11 which is controlled by a thermostat 12 for maintaining the contents of the extraction column at desired temperature. The material to be processed, e. g., soap stock in the form of a thick viscous liquid, is supplied via measuring pump 13 and is mixed with aqueous alcohol which is supplied via measuring pump 14, the mixture being then pumped via conduit 15 to a heating coil 16 in the water-bath 10, from whence the heated mixture is discharged into the lower portion of the column 1 via baffled inlet 17. Solvent such as perchlorethylene is supplied via measuring pump 18 and conduit 19 to a heating coil 20 in the water-bath 10, from whence the heated solvent is discharged into the upper portion of the column 1 via inlet 21.

Oil-bearing solvent gravitationally settles into the quiescent zone 25 below the inlet 17, and is discharged via conduit 26 from whence it overflows via conduit 27 into the still 4. Aqueous alcohol with saponified free fatty acids of the original material dissolved therein, and with remaining constituents dissolved and/or suspended therein, but with neutral and/or unsaponifiable oils having been solvent-extracted and separately withdrawn by the perchlorethylene, discharges via the quiescent zone 28 above the inlet 21, and thence via conduit 29 from which it overflows via conduit 30 into the mixer 2. The conduits 26—29 are connected at 31 for equalizing pressure, with the overflows at 27—30 at such relative level that the solvent for the oil, e. g., perchlorethylene, stands in the column 1 to a level A just below the intake 21.

Solvent such as perchlorethylene is supplied to the mixer 2, and is preferably a portion of the solvent which is supplied via the pump 18. For this purpose, a branch conduit 32 leads from the solvent supply conduit 19 to the conduit 30, the proportional flow to the extraction column 1 via the intake 21 and to the mixer 2 via the conduit 30 being regulated by valves 33—34.

Acid such as sulfuric acid is supplied to the mixer 2 via conduit 35, preferably from storage 36, with the acid supply regulated by a valve 37 so that it is sufficient to displace free fatty acids from their salts which are dissolved in the aqueous alcohol which is supplied to the mixer 2 via the conduit 30. The solvent which is supplied via the conduit 32 is added to the solution-suspension which is supplied via the conduit 30, before acid is added to the mixture via the conduit 35. Acidification, for displacing free fatty acids from their salts, thus takes place in the presence of the solvent, whereby free fatty acids dissolve in the solvent as they are displaced, thereby adapting the process to continuous flow through the mixer 2.

From the mixer 2, free fatty acids in solution in the solvent which has been supplied via the conduit 32, and remaining constituents which are dissolved and/or suspended in the aqueous alcohol, are discharged into the settling chamber 3 via conduit 40 which opens into the lower portion of the settling chamber via a baffled inlet 41.

Free fatty acids in solution, settle into a quiescent zone 42 below the inlet 41, and overflow via conduit 43 into still 5, with pressure in the conduit 43 and in the upper portion of the settling chamber equalized via conduit 44. Aqueous alcohol, with remaining constituents in solution and/or suspension, rises in the settling chamber and overflows via conduit 46. The conduit 46 communicates laterally with a vertical conduit 48 at the level B, with the conduit 48 discharging into the storage tank 9; and an overflow conduit 49 extends upwardly from the laterally extending portion of the conduit 46 and leads to the still 6.

Vapors from the stills 4, 5 and 6 may be withdrawn via a common conduit 50, to a condenser 51 from whence the distillate discharges into the separator 7 via conduit 59. The solvent for the oleaginous constituents, e. g., perchlorethylene, being appreciably heavier than aqueous alcohol, settles to the bottom of the separator 7 and overflows via conduit 52 into storage tank 8, with pressure in the conduit 52 and in the upper portion of the separator equalized via conduit 53; and from storage at 8 the perchlorethylene is returned via conduit 54 to the pump 18, for reuse in the system. Pressure in the storage tank 8 is equalized via conduit 55.

From the separator 7, aqueous alcohol distillate overflows via stand-pipe 56 which communicates with the vertical conduit 48. The storage tank 9 thus receives aqueous alcohol distillate from the separator 7, and also receives aqueous alcohol (with remaining constituents in solution and/or suspension) via the conduit 46. From the storage tank 9, aqueous alcohol (in which some remaining constituents may still be in solution and/or suspension) is returned via conduit 57 to the pump 14 for reuse in the system.

The alcohol-content of the aqueous alcohol which is originally in the system, is such, depending upon the water-content of the particular material which is being processed, as to provide the desired ratio of alcohol to total water-content, i. e., water-content of the material which is being processed together with water-content of the aqueous alcohol. But during processing of material, if its water-content were not expelled from the system it would be returned to the storage tank 9 along with the original aqueous alcohol, as would progressively increase the water-content of the aqueous alcohol.

Therefore, this excess water is automatically expelled via an overflow 61 which leads from the still 6 at the end thereof remote from the inlet to the still from the conduit 49.

Before supplying material via pump 13, aqueous alcohol (of desired concentration) is circulated through the system until desired temperature is obtained, the volume of this aqueous alcohol being such that its return via conduits 46—48 will at all times maintain the storage tank 9 and the conduit 48 filled to at least the level B. Material which is to be processed being then supplied to the circulating aqueous alcohol for processing as previously described, discharge from the settling chamber 3 and thence via the conduit 46 (which discharge will include water from the material being processed) overflows via the conduit 49 for passage through the still 6.

During the passage of this excess flow through the still 6 toward its outlet 61, substantially all of the alcohol is vaporized and withdrawn via the vapor outlet 50 before reaching the overflow outlet 61, so that only water (with remaining constituents dissolved and/or suspended therein) discharges via the outlet 61. Substantially all of the alcohol is thus retained in the system by passage of its vapors through the condenser 51 and return of the distillate via the stand-pipe 56 and the conduit 48, while water in excess of that which will cause aqueous alcohol in the storage tank 9 and in the conduit 48 to maintain at least the level B, is expelled from the system, thereby maintaining the original concentration of the aqueous alcohol which is in the storage tank 9 and which furnishes the supply of aqueous alcohol for return to the system via the pump 14.

Neutral and/or unsaponifiable oils which are the residue in the still 4, may discharge to storage via conduit 62, and in similar manner free fatty acids which are the residue in the still 5, may be discharged to separate storage via conduit 63. The conduits 62—63, and also the conduit 61 whereby excess water and residual constituents are discharged from the still 6, may each be provided with a usual liquid seal, shown as a U-tube 65, for continuous discharge from the stills while sealing against escape of vapors.

The neutral and/or unsaponifiable oils, and the separately recovered free fatty acids, are commercial products, adapted for any desired subsequent processing depending upon the use which is to be made of the same; and the water overflow from the still 6, containing residual constituents in solution and/or suspension and consisting principally of sodium silicates, coloring matter, glycerine and alkaline salts of the acid which has been used in the mixer 2, e. g., alkaline sulfates, may be processed in any desired manner for recovering any of these constituents which it is commercially practical to recover, e. g., glycerine and alkaline sulfates.

As a modification of the above described process wherein aqueous alcohol (with soap in solution and with remaining constituents in solution and/or suspension) is withdrawn from the extraction column 1 and processed for recovering free fatty acids, the stearic acid constituent of said free fatty acids may be recovered separately from the other free fatty acids.

For this purpose, before acidification of the alcohol-water-soap solution which is discharged from the extraction column 1, it may be directed through an auxiliary mixer 70 and thence through an auxiliary settling chamber 71 before entering the mixer 2. As an instance of this arrangement, a branch conduit 72 leads from the conduit 29 to the auxiliary mixer 70, with valves 73—74 directing flow to the mixer 2 for processing as previously described or diverting the flow through the auxiliary mixer 70 and thence through the auxiliary settling chamber 71 before entering the mixer 2.

The fatty acid constituents of this flow are present as alkaline salts of the fatty acids dissolved in aqueous alcohol, and in the mixer 70 that portion of these alkaline salts which comprises stearates, is converted to an insoluble salt of stearic acid such as aluminum stearate. The insoluble aluminum stearate is then precipitated from the aqueous alcohol, in which the alkaline salts of the other fatty acids remain in solution and in which remaining constituents are dissolved and/or suspended.

The stearates of the alkaline salts which are in solution in the aqueous alcohol, may be converted to insoluble aluminum stearate by adding an aluminum salt, such as aluminum sulfate, which may be supplied from storage 75 via conduit 76 which leads to the conduit 72, and which is provided with a valve 77 for regulating the supply of aluminum sulfate. A medium of relatively high specific gravity, for insuring precipitation of the insoluble aluminum stearate as a suspension in said medium, is preferably also added; and may be a solvent of relatively high specific gravity such as previously described, e. g., perchlorethylene, which may be supplied via a branch conduit 78 leading from the solvent supply conduit 19 to the conduit 72 and provided with a valve 79 for diverting a portion of the solvent to the auxiliary mixer 70 when the latter is to be employed.

From the mixer 70, the flow discharges into the auxiliary settling chamber 71 via conduit 80 which opens into the lower portion of the settling chamber via a baffled inlet 81. The insoluble aluminum stearate settles with the medium of relatively high specific gravity in which it is suspended, e. g., perchlorethylene, into a quiescent zone 82 below the inlet 81, and the perchlorethylene, with the aluminum stearate in suspension, overflows via conduit 83, with pressure in the conduit 83 and in the upper portion of the settling chamber equalized via a conduit 84. This overflow discharges via conduit 85 to a dryer (not shown), for recovering the aluminum stearate free of perchlorethylene.

Aqueous alcohol, with the other fatty acids still in the form of alkaline salts which are dissolved in the aqueous alcohol, and with remaining constituents dissolved and/or suspended in the aqueous alcohol, rises in the settling chamber 71 and overflows via a conduit 86 at the upper portion of the settling chamber, with the rate of flow such that the insoluble aluminum stearate is precipitated with the perchlorethylene but other insoluble constituents remain suspended in the aqueous alcohol for withdrawal therewith. For this purpose a rate of flow such as previously described, e. g., ½ inch per minute, vertical flow, may be advantageously employed.

The conduit 86 leads to the conduit 30, whereby the overflow from the settling chamber 71, i. e., aqueous alcohol with soaps of the fatty acids (other than stearic acid) in solution and with remaining constituents in solution and/or suspension, is supplied to the mixer 2 for processing, as previously described, for separately recovering these remaining free fatty acids.

The elements of the apparatus are arranged whereby the temperature of approximately 150 to 155° F. which is maintained in the extraction column 1, will maintain the desired temperature of approximately 145° F. throughout subsequent processing, either via the main mixer and settling chamber 2—3 (when the auxiliary mixer and settling chamber 70—71 is not employed), or via the auxiliary mixer and settling chamber and thence via the main mixer and settling chamber (when the auxiliary mixer and settling chamber are employed).

While the apparatus as described is particularly adapted for processing soap stock in which free fatty acids are present as alkaline salts when the oleaginous material is first supplied to the apparatus via the pump 13, it will be understood that the apparatus and process are also applicable to processing oleaginous material in which free fatty acids are present as such, e. g., grease from garbage, etc., it being simply necessary in this case to saponify the free fatty acids in usual manner and in any suitable apparatus (not shown), prior to processing the oleaginous material as herein described.

I claim:

1. In processing oleaginous material, the steps of: adding aqueous alcohol, counterflowing a chlorinated hydrocarbon relative to the oleaginous material and the aqueous alcohol for solvent-extracting oleaginous constituents, the alcohol being not more than approximately 50% by volume of the total alcohol-water content.

2. In processing oleaginous material, the steps of: adding aqueous alcohol, counterflowing a chlorinated hydrocarbon relative to the oleaginous material and the aqueous alcohol for solvent-ture of approximately 150 to 155° F. for solvent-extracting oleaginous constituents, the alcohol being not more than approximately 50% by volume of the total alcohol-water content.

3. In processing oleaginous material, the steps of: adding aqueous alcohol, counterflowing a chlorinated hydrocarbon for downwardly flowing solvent-extraction of oleaginous constituents and upwardly flowing withdrawal of aqueous alcohol, and withdrawing the aqueous alcohol at a rate of flow less than that which would retard gravitational separation of the solution of oleaginous constituents but sufficient to carry with it remaining constituents suspended in the aqueous alcohol.

4. In processing oleaginous material, the steps of: adding aqueous alcohol, counterflowing a chlorinated hydrocarbon for downwardly flowing solvent-extraction of oleaginous constituents and upwardly flowing withdrawal of aqueous alcohol, and withdrawing the aqueous alcohol at a rate of flow approximately ½ inch per minute.

5. In processing oleaginous material, the steps of: adding aqueous alcohol, counterflowing a chlorinated hydrocarbon at temperature of approximately 150 to 155° F. for downwardly flowing solvent-extraction of oleaginous constituents and upwardly flowing withdrawal of aqueous alcohol, the alcohol being not more than approximately 50% by volume of the total alcohol-water content, and withdrawing the aqueous alcohol at a rate of flow approximately ½ inch per minute.

6. In processing oleaginous material in which free fatty acids are present as alkaline salts of the free fatty acids, the steps of: adding aqueous alcohol and a chlorinated hydrocarbon to form an aqueous alcohol solution of the alkaline salts and a chlorinated hydrocarbon solution of neutral and unsaponifiable oils, gravitationally separating the aqueous alcohol and the chlorinated hydrocarbon solutions, displacing free fatty acids from the aqueous alcohol solution in the presence of a chlorinated hydrocarbon, and solvent-extracting the displaced free fatty acids by the last mentioned chlorinated hydrocarbon.

7. In processing oleaginous material in which free fatty acids are present as alkaline salts of the free fatty acids, the steps of: forming an aqueous alcohol solution of the alkaline salts, the alcohol being not more than approximately 50% by volume of the total alcohol-water content, counterflowing a chlorinated hydrocarbon for downwardly flowing solvent-extraction of neutral and unsaponifiable oils and upwardly flowing withdrawal of the aqueous alcohol solution, displacing free fatty acids from flow of the aqueous alcohol solution in the presence of a chlorinated hydrocarbon, and solvent-extracting the displaced free fatty acids by the last mentioned chlorinated hydrocarbon.

8. In processing oleaginous material containing water, the steps of: adding aqueous alcohol of concentration providing predetermined alcohol percentage of the total alcohol-water content, adding a chlorinated hydrocarbon to form a chlorinated hydrocarbon solution of oleaginous constituents, gravitationally separating the aqueous alcohol and the chlorinated hydrocarbon solution, distilling the alcohol, expelling excess water of the aqueous alcohol, and returning the alcohol distillate to residual water of the aqueous alcohol, the expansion of water being such that the alcohol distillate and the residual water form aqueous alcohol of the aforesaid concentration for reuse as the first step of the process.

9. In processing oleaginous material containing water and in which free fatty acids are present as alkaline salts of the free fatty acids, the steps of: forming an aqueous alcohol solution of the alkaline salts, the aqueous alcohol being of concentration whereby the alcohol is not more than approximately 50% by volume of the total alcohol-water content, counterflowing a chlorinated hydrocarbon for downwardly flowing solvent-extraction of neutral and unsaponifiable oils and upwardly flowing withdrawal of the aqueous alcohol solution, acidifying and displacing free fatty acids from flow of the aqueous alcohol solution in the presence of a chlorinated hydrocarbon, so as to form a chlorinated hydrocarbon solution of the free fatty acids, gravitationally separating the chlorinated hydrocarbon and the aqueous alcohol solutions, distilling the alcohol, expelling excess water of the aqueous alcohol, and returning the alcohol distillate to residual water of the aqueous alcohol, the expulsion of water being such that the alcohol distillate and the residual water form aqueous alcohol of the aforesaid concentration for reuse as the first step of the process.

10. In processing oleaginous material, the steps of: adding aqueous alcohol, the alcohol being not more than approximately 50% by volume of the total alcohol-water content, counterflowing a chlorinated hydrocarbon for downwardly flowing solvent-extraction of oleaginous constituents and upwardly flowing withdrawal of aqueous alcohol, and withdrawing the aqueous alcohol at a rate of flow less than that which would retard gravitational separation of the solution of oleaginous constituents but sufficient to carry with it remaining constituents suspended in the aqueous alcohol.

11. In processing oleaginous material, the steps of: adding aqueous alcohol, the alcohol being not more than approximately 50% by volume of the total alcohol-water content, counterflowing a chlorinated hydrocabon for downwardly flowing solvent-extraction of oleaginous constituents and upwardly flowing withdrawal of aqueous alcohol, and withdrawing the aqueous alcohol at a rate of flow approximately ½ inch per minute.

12. In processing oleaginous material in which free fatty acids are present as alkaline salts of the free fatty acids, the steps of: adding aqueous alcohol and a chlorinated hydrocarbon to form an aqueous alcohol solution of the alkaline salts and a chlorinated hydrocarbon solution of neutral and unsaponifiable oils, the alcohol being not more than approximately 50% by volume of the total alcohol-water content, gravitationally separating the aqueous alcohol and the chlorinated hydrocarbon solutions, displacing free fatty acids from the aqueous alcohol solution in the presence of a chlorinated hydrocarbon, and solvent-extracting the displaced free fatty acids by the last mentioned chlorinated hydrocarbon.

13. In processing oleaginous material containing water, the steps of: adding aqueous alcohol of concentration whereby the alcohol is not more than approximately 50% by volume of the total alcohol-water content, adding chlorinated hydrocarbon to form a chlorinated hydrocarbon solution of oleaginous constituents, gravitationally separating the aqueous alcohol and the chlorinated hydrocarbon solution, distilling the alcohol, expelling excess water of the aqueous alcohol, and returning the alcohol distillate to residual water of the aqueous alcohol, the expulsion of water being such that the alcohol distillate and the residual water form aqueous alcohol of the aforesaid concentration for reuse as the first step of the process.

14. In processing oleaginous material in which free fatty acids are present as alkaline salts of the free fatty acids, the steps of: adding aqueous alcohol and a chlorinated hydrocarbon to form an aqueous alcohol solution of the alkaline salts and a chlorinated hydrocarbon solution of neutral and unsaponifiable oils, gravitationally separating the aqueous alcohol and the chlorinated hydrocarbon solutions, converting stearates of the alkaline salts to stearates which are insoluble in the aqueous alcohol, and adding to the aqueous alcohol solution, a chlorinated hydrocarbon of specific gravity greater than the aqueous alcohol solution for precipitating the insoluble stearates as a suspension in said second mentioned chlorinated hydrocarbon.

15. In processing alkaline salts of free fatty acids, the steps of: forming an aqueous alcohol solution of said alkaline salts, converting stearates of the alkaline salts to stearates which are insoluble in the aqueous alcohol, and adding to the aqueous alcohol solution, a chlorinated hydrocarbon of specific gravity greater than the aqueous alcohol solution for precipitating the insoluble stearates as a suspension in said chlorinated hydrocarbon.

16. In processing oleaginous material in which free fatty acids are present as alkaline salts of the free fatty acids, the steps of: adding aqueous alcohol and a chlorinated hydrocarbon to form an aqueous alcohol solution of the alkaline salts and a chlorinated hydrocarbon solution of neutral and unsaponifiable oils, the alcohol being not more than approximately 50% by volume of the total alcohol-water content, gravitationally separating the aqueous alcohol and the chlorinated hydrocarbon solutions, converting stearates of the alkaline salts to stearates which are insoluble in the aqueous alcohol, and adding to the aqueous alcohol solution, a chlorinated hydrocarbon of specific gravity greater than the aqueous alcohol solution for precipitating the insoluble stearates as a suspension in said second mentioned chlorinated hydrocarbon.

17. In processing oleaginous material in which free fatty acids are present as alkaline salts of the free fatty acids, the steps of: forming an aqueous alcohol solution of the alkaline salts, the alcohol being not more than approximately 50% by volume of the total alcohol-water content, counterflowing a chlorinated hydrocarbon for downwardly flowing solvent-extraction of neutral and unsaponifiable oils and upwardly flowing withdrawal of the aqueous alcohol solution, converting stearates of the alkaline salts to stearates which are insoluble in the aqueous alcohol, adding to the aqueous alcohol solution, a chlorinated hydrocarbon of specific gravity greater than the aqueous alcohol solution for precipitating the insoluble stearates as a suspension in said second mentioned chlorinated hydrocarbon, displacing remaining free fatty acids from the aqueous alcohol solution in the presence of a chlorinated hydrocarbon, and solvent-extracting the displaced free fatty acids by said last mentioned chlorinated hydrocarbon.

18. In processing alkaline salts of free fatty acids, the steps of: forming an aqueous alcohol solution of said alkaline salts, the alcohol being not more than approximately 50% by volume of the total alcohol-water content, converting stearates of the alkaline salts to stearates which are insoluble in the aqueous alcohol, and adding to the aqueous alcohol solution, a chlorinated hydrocarbon of specific gravity greater than the aqueous alcohol solution for precipitating the insoluble stearates as a suspension in said chlorinated hydrocarbon.

DAN McDONALD.